United States Patent
Chafle et al.

(10) Patent No.: US 10,970,182 B2
(45) Date of Patent: Apr. 6, 2021

(54) LEARNING-BASED DRIFT DETECTION TOOL

(71) Applicant: International Business Machines Corporation, Armonk, NY (US)

(72) Inventors: Girish B. Chafle, New Delhi (IN); Peng Fei Chen, Beijing (CN); Fan Jing Meng, Beijing (CN); Hai Shan Wu, Beijing (CN); Jing Min Xu, Beijing (CN); Lin Yang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 831 days.

(21) Appl. No.: 15/059,594

(22) Filed: Mar. 3, 2016

(65) Prior Publication Data

US 2017/0255874 A1 Sep. 7, 2017

(51) Int. Cl.
*G06N 20/00* (2019.01)
*G06F 11/263* (2006.01)
(Continued)

(52) U.S. Cl.
CPC ........ *G06F 11/263* (2013.01); *G06F 11/3452* (2013.01); *G06N 20/00* (2019.01);
(Continued)

(58) Field of Classification Search
CPC . G06F 17/30368; G06F 11/00; G06N 99/005; G06N 20/00
See application file for complete search history.

(56) References Cited

U.S. PATENT DOCUMENTS 6,769,066 B1 * 7/2004 Botros ............... G06F 21/55
 700/110
8,762,508 B2 6/2014 Shah et al.
(Continued)

OTHER PUBLICATIONS

Hassan Hajji, "Statistical Analysis of Network Traffic for Adaptive Faults Detection", Sep. 2005, IEEE Transactions on Neural Networks, vol. 16, No. 5, Sep. 2005, pp. 1053-1063. (Year: 2005).*
(Continued)

*Primary Examiner* — Kamran Afshar
*Assistant Examiner* — Ying Yu Chen
(74) *Attorney, Agent, or Firm* — Cantor Colburn LLP; Joseph Petrokaitis

(57) ABSTRACT

Embodiments are directed to a computer implemented method for generating a drift detector. The method includes generating, using a processor system, drift cases based at least in part on known drift set data of a computer system. The method further includes injecting, using the processor system, the drift cases into the computer system to generate a first data set. The method further includes applying, using the processor system, cleaning rules to the first data set to reduce a size of the first data set and generate a cleaned data set. The method further includes extracting one or more features of the cleaned data set. The method further includes normalizing the extracted one or more features of the cleaned data set. The method further includes training a machine learning system using the extracted and normalized one or more features of the cleaned data, wherein an output of the machine learning system comprises the drift detector.

20 Claims, 14 Drawing Sheets

(51) Int. Cl.
  *G06F 11/34*      (2006.01)
  *G06N 20/10*      (2019.01)
  *G06F 11/30*      (2006.01)

(52) U.S. Cl.
  CPC .......... *G06N 20/10* (2019.01); *G06F 11/3006* (2013.01); *G06F 11/3414* (2013.01)

(56) References Cited

U.S. PATENT DOCUMENTS

| | | | |
|---|---|---|---|
| 9,979,740 B2* | 5/2018 | Christian | H04L 63/1425 |
| 2013/0232123 A1* | 9/2013 | Ahmed | G06F 17/30289 |
| | | | 707/690 |

OTHER PUBLICATIONS

Federico Maggi, William Robertson, Christopher Kruegel, and Giovanni Vigna, "Protecting a Moving Target: Addressing Web Application Concept Drift", 2009, RAID 2009, LNCS 5758, pp. 21-40. (Year: 2009).*

Barroso et al., "The Datacenter as a Computer: An Introduction to the Design of Warehouse-Scale Machines," Synthesis Lectures on Computer Architecture 8.3, 2013, Abstract, 8 pages.

Oppenheimer et al., "Why do Internet services fail, and what can be done about it?" Proceedings of the 4th Conference on USENIX Symposium on Internet Technologies and Systems, vol. 4, USENIX Association, 2003, 15 pages.

Yin et al., "An Empirical Study on Configuration Errors in Commercial and Open Source Systems," Proceedings of the Twenty-Third ACM Symposium on Operating Systems Principles, ACM, 2011, pp. 159-172.

* cited by examiner

DOMAIN INDEPENDENT CLEANING RULE EXAMPLES

- ^/boot/.*
- ^/dev/.*
- ^/proc/.*
- ^/sys /.*
- ^/mnt /.*
- ^/tmp/.*|.*/wstemp/.*|.*/temp/.*
- ^/var/spool/.*
- .*\.log$|^/var/log/.*|.*/logs/.*|.*\.pak$
- .*\.class$|^/var/cache/.*|^/var/run/.*
- ...

FIG. 7

FEATURE DEFINITION

- CHANGE OBJECT:
    - *OBJECT-TYPE*: e.g. file/directory, package, network services/connections
    - *OBJECT-METADATA*: e.g. "name", "path", "MIME-type", "size", "ctime", "mtime", "atime", "permission", and etc. for a file;
- CHANGE BEHAVIOR:
    - *CHANGE-TIME*: e.g. 07/31/14 06:00:05
    - *CHANGE-TYPE*: e.g. "create", "delete", "update", "update_meta";
    - *CHANGE-CONTENT*: e.g."OldContent";"...", "NewContent";"..."
    - *CHANGE-ATTRIBUTE*: e.g. "permission"
    - *PRE-VALUE*: e.g. "755"
    - *POST-VALUE*: e.g. "644"
- CHANGE CHARACTERISTIC:
    - *CHANGE-SEQUENCE*: e.g. (U,M,U,M,U,M), (P)
    - *CHANGE-FREQUENCY(CF)*: e.g. 0.1, 0.78
    - *CHANGE-DENSITY(CD)*: e.g. 1.5, 0.9

FIG. 8

MISCONFIGURATION:
InitiatorName: iqn.time.domain:TARGET
SYMPTOM:
THE STORAGE SHARE CANNOT BE RECOGNIZED.
ROOT CAUSE:
InitiatorName ONLY ALLOWS LOWERCASE LETTERS, WHILE THE USER SETS THE NAME WITH THE CAPITAL LETTERS "TARGET"

DIAGNOSIS EFFORTS
75 ROUNDS OF COMMUNICATION
10 COLLECTIONS OF SYSTEM LOGS

EXAMPLE 1: A REAL-WORLD EXAMPLE FROM A COMMERCIAL COMPANY.
THE CONFIGURATION CONSTRAINT WAS TOO STRICT AND USERS
MADE MISTAKES DESPITE TWO DOCUMENTS EXPLAINING IT.

MISCONFIGURATION:
LISTENER-THREADS 32
SYMPTOM:
CRASH AFTER SERVER STARTUP WITH THE ONLY
LOG MESSAGE: *"SEGMENTATION FAULT"*.
ROOT CAUSE:
OpenLDAP ONLY SUPPORTS A HARD-CODED
MAXIMUM OF 16 LISTENER THREADS

THE USER MANUAL DOES NOT MENTION THIS LIMIT.

DEVELOPER'S RESPONSE:
REFUSED TO CHANGE THE SOURCE
CODE AND THE MANUAL BECAUSE
*THE SETTING IS NOT VALID.*

EXAMPLE 2: A REAL-WORLD EXAMPLE FROM OpenLDAP. THE
SERVER CRASHES WHEN "LISTENER-THREADS" IS SET TO BE LARGER
THAN 16. MORE REAL-WORLD EXAMPLES ARE GIVEN IN FIGURE 7

SYSTEM CHANGE

Timestamp: 07/31/14 06:00:05
Object-type: File
Object-name: /lib/libcplex101.so
Object-metadata-MIME-type: application/octet-stream
Change-behavior: update_meta
Changed-attribute: "permission"
Pre-value: "755"
Post-value: "644"
{ "ctime", "1403657421", "1406786206" }

SYSTEM OBJECTS

Object-name: /POT_Config/database.xml
Object-type: File
Object-metadata-MIME-type: application/octet-stream
Change sequence: CF / CD
(U.M.A): 0.23076923 / 1.0769231

FEATURE NORMALIZATION EXAMPLES

| Timestamp | Object-type | Object-name |
|---|---|---|
| 07/31/14 06:00:05 | File | /lib/libcplex101.so |

Object-metadata-MIME-type: application/octet-stream

Change-behavior: update_meta

Changed-attribute: "permission"
Pre-value: "755", "644"
Post-value: "ctime", "1403857421", "1406786906"

→ NORMALIZATION APPROACH (E.G. FUZZY TOKEN MATCHING APPROACH OR OTHER APPROACHES)

| ObjectType | FilePath | FileName | FileExtension | ChangeBehavior | ChangeAttribute | PRE-VALUE | POST-VALUE | LABEL |
|---|---|---|---|---|---|---|---|---|
| 1 | 0.2353 | 0.5321 | 0.9237 | 2 | 1 | 755 | 644 | 1 = ABNORMAL<br>0 = NORMAL |

FIG. 12

LEARNING-BASED DRIFT DETECTION TOOL

BACKGROUND

The present disclosure relates in general to identifying the root cause of reduced performance and/or failure in computing systems and applications (e.g., computer programs). More specifically, the present disclosure relates to systems and methodologies for efficiently and effectively detecting abnormal change (i.e., "drift") in large, complex computing systems and applications that can result in reduced system/application performance and/or system/application failure.

The terms "computer system" or "computing system" encompass virtually any hardware and software system that processes data. Computer systems range from small handheld devices to large, complex computing systems such as corporate data centers, database management systems (DBMSs) and massive server farms that offer cloud computing. A difficult task in the deployment and maintenance of large, complex computing systems/applications is ensuring that the system continues to supply the expected behavior in the presence of change.

Computer systems typically start in a desired state, wherein the expected behavior of the system is consistently provided. However, the desired state of a system changes over time due to a variety of factors, including, for example, daily execution, maintenances and updates. Change that evolves the desired state of a system is referred to herein as a normal change. On the other hand, change that does not evolve the desired state of a system is referred to herein as an abnormal change or "drift." Accordingly, a system experiences drift when it shifts from a normal or desired state, wherein the expected behavior of the system is consistently provided, to an abnormal or undesired state, wherein the expected behavior of the system is not consistently provided. Drift impacts system performance at different levels of severity, from inconsistent or decreased application/service-level functionality to complete system outages. Any reduced system performance caused by drift can result in some form of financial loss. For example, a complete system outage to a large, online commerce system can result in significant lost sales, as well as damage to the merchant's brand and reputation.

SUMMARY

Embodiments are directed to a computer implemented method for generating a drift detector. The method includes generating, using a processor system, drift cases based at least in part on known drift set data of a computer system. The method further includes injecting, using the processor system, the drift cases into the computer system to generate a first data set. The method further includes applying, using the processor system, cleaning rules to the first data set to reduce a size of the first data set and generate a cleaned data set. The method further includes extracting one or more features of the cleaned data set. The method further includes normalizing the extracted one or more features of the cleaned data set. The method further includes training a machine learning system using the extracted and normalized one or more features of the cleaned data, wherein an output of the machine learning system comprises the drift detector.

Embodiments are further directed to a computer system for generating a drift detector. The system includes a memory and a processor system communicatively coupled to the memory, wherein the processor system is configured to perform a method. The method includes generating drift cases based at least in part on known drift set data of a computer system. The method further includes injecting the drift cases into the computer system to generate a first data set. The method further includes applying cleaning rules to the first data set to reduce a size of the first data set and generate a cleaned data set. The method further includes extracting one or more features of the cleaned data set. The method further includes normalizing the extracted one or more features of the cleaned data set. The method further includes training a machine learning system using the extracted and normalized one or more features of the cleaned data, wherein an output of the machine learning system comprises the drift detector.

Embodiments are further directed to a computer program product for generating a drift detector. The computer program product includes a computer readable storage medium having program instructions embodied therewith, wherein the computer readable storage medium is not a transitory signal per se. The program instructions are readable by a processor system to cause the processor system to perform a method. The method includes generating drift cases based at least in part on known drift set data of a computer system. The method further includes injecting the drift cases into the computer system to generate a first data set. The method further includes applying cleaning rules to the first data set to reduce a size of the first data set and generate a cleaned data set. The method further includes extracting one or more features of the cleaned data set. The method further includes normalizing the extracted one or more features of the cleaned data set. The method further includes training a machine learning system using the extracted and normalized one or more features of the cleaned data, wherein an output of the machine learning system comprises the drift detector.

Additional features and advantages are realized through techniques described herein. Other embodiments and aspects are described in detail herein. For a better understanding, refer to the description and to the drawings.

BRIEF DESCRIPTION OF THE DRAWINGS

The subject matter which is regarded as embodiments is particularly pointed out and distinctly claimed in the claims at the conclusion of the specification. The foregoing and other features and advantages of the embodiments are apparent from the following detailed description taken in conjunction with the accompanying drawings in which:

FIG. 7 depicts domain independent cleaning rule examples according to one or more embodiments;

FIG. 8 depicts a feature definition example according to one or more embodiments;

FIG. 10 depicts additional drift case generation examples according to one or more embodiments;

FIG. 11 depicts feature extraction examples according to one or more embodiments;

FIG. 12 depicts feature normalization examples according to one or more embodiments;

Figure 1:
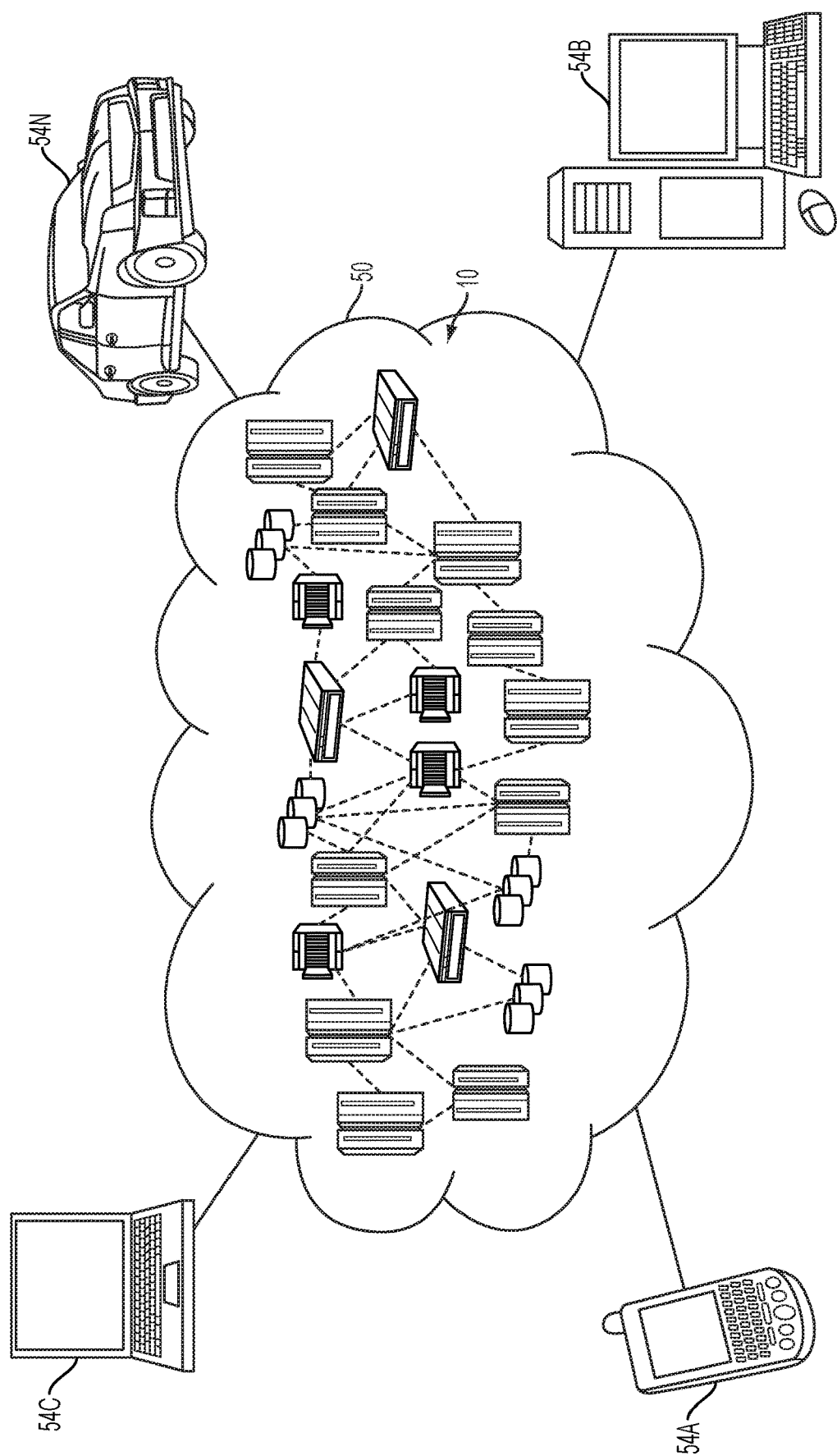
FIG. 1 depicts a cloud computing environment according to one or more embodiments of the present disclosure.

In the accompanying figures and following detailed description of the disclosed embodiments, the various elements illustrated in the figures are provided with three digit reference numbers. The leftmost digits of each reference number corresponds to the figure in which its element is first illustrated.

DETAILED DESCRIPTION

Various embodiments of the present disclosure will now be described with reference to the related drawings. Alternate embodiments may be devised without departing from the scope of this disclosure. Various connections are set forth between elements in the following description and in the drawings. These connections, unless specified otherwise, may be direct or indirect, and the present disclosure is not intended to be limiting in this respect. Accordingly, a coupling of entities may refer to either a direct or an indirect connection.

Additionally, although this disclosure includes a detailed description of a computing device configuration including a feature extractor and a classifier/machine learning module, implementation of the teachings recited herein are not limited to a particular type or configuration of computing device(s). Rather, embodiments of the present disclosure are capable of being implemented in conjunction with any other type or configuration of wireless or non-wireless computing devices and/or computing environments, now known or later developed.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
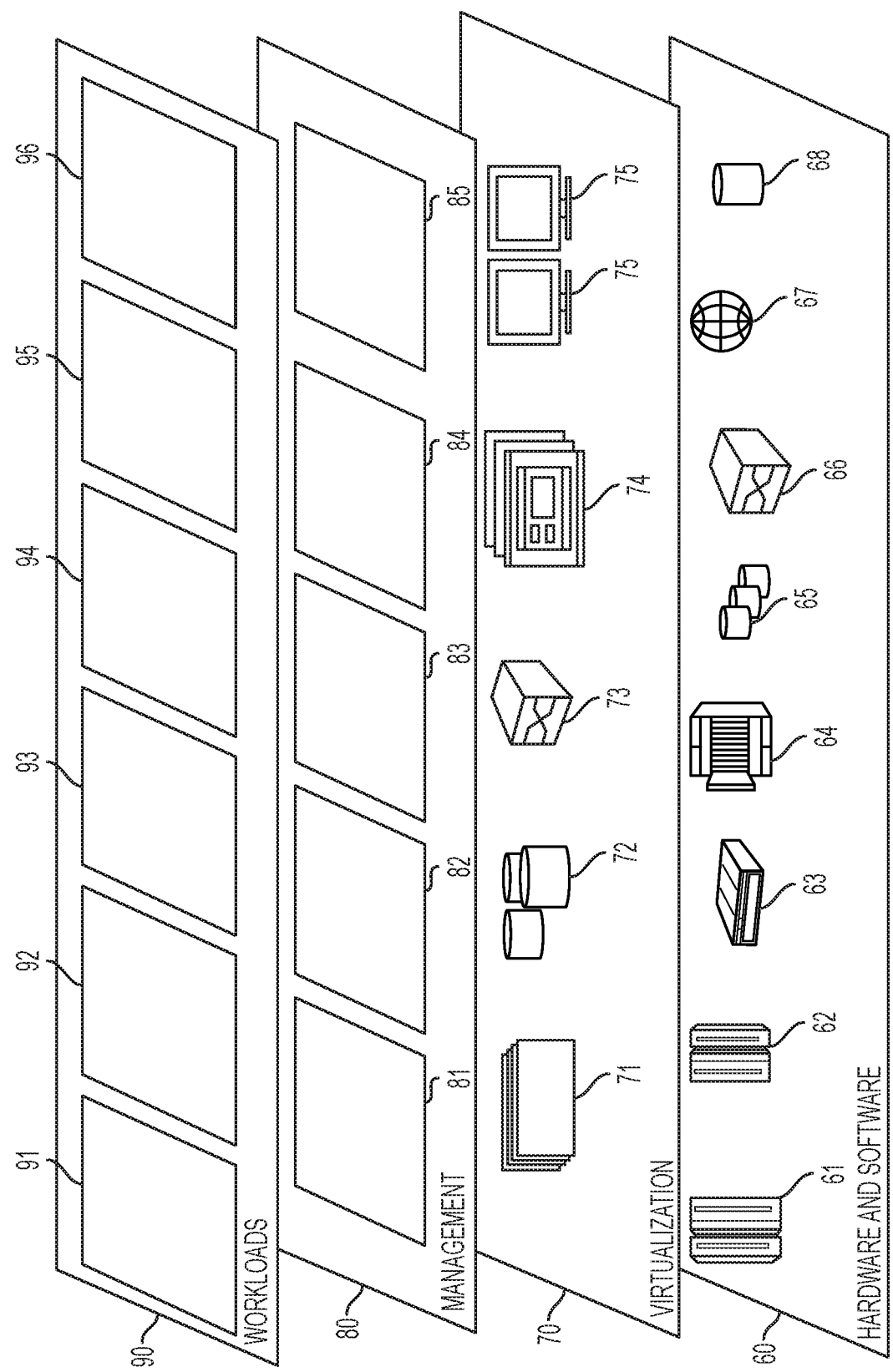
FIG. 2 depicts abstraction model layers according to one or more embodiments of the present disclosure.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and learning-based drift detection tool generator 96.

As previously noted herein, a difficult task in the deployment and maintenance of large, complex computing systems/applications is ensuring that the system continues to supply the expected behavior in the presence of change. Computer systems typically start in a desired state, wherein the expected behavior of the system is consistently provided. However, the desired state of a system changes over time due to a variety of factors, including, for example, daily execution, maintenances and updates. Change that evolves the desired state of a system is referred to herein as a normal change. On the other hand, change that does not evolve the desired state of a system is referred to herein as an abnormal change or "drift." Accordingly, a system experiences drift when it shifts from a normal or desired state, wherein the expected behavior of the system is consistently provided, to an abnormal or undesired state, wherein the expected behavior of the system is not consistently provided. Drift impacts system performance at different levels of severity, from inconsistent or decreased application/service-level functionality to complete system outages. Any reduced system performance caused by drift can result in some form of financial loss. For example, a complete system outage to a large, online commerce system can result in significant lost sales, as well as damage to the merchant's brand and reputation.

For a variety of reasons, it can be difficult to detect the root cause of drift. For example, drift may occur at different levels of the system, including at the operating system (OS) (e.g., host name, internet protocol (IP), the fully qualified host name (FQHN), kernel upgrades, patches), at the package level (e.g., installation, configuration, un-installations, upgrades), at the middleware level (e.g., configurations, patches, services), at the application level (configurations, patches, services) and at the network connection level (e.g., services start/stop, connection established/stop). Additionally, the amount of data that must be analyzed in order to locate the root cause of drift can be large. For example, some middleware application servers can have over nine-hundred (900) configuration files, and their administration and configuration guides can contain are over one-thousand (1,000) pages of data and information. Some DBMSs can have over two-hundred (200) initialization parameters, almost one thousand five-hundred (1,500) tables of system parameters and over eight-hundred (800) pages of data and information in their administration and configuration guides.

Known approaches to applying structure to the detection of the root cause of drift depend heavily on input from subject matter experts. Accordingly, it would be beneficial to provide systems and methodologies for detecting the root cause of drift that reduces and/or eliminates the dependence on subject matter experts.

Turning now to an overview of the present disclosure, one or more embodiments provide systems and methodologies for identifying the root cause of reduced performance and/or failure in computing systems and applications. More specifically, the present disclosure provides learning-based systems and methodologies for efficiently and effectively detecting abnormal change (i.e., "drift") in large, complex computing systems and applications that can result in reduced system/application performance and/or system/application failure. The learning-based systems and methodologies for detecting the root cause of drift according to the present disclosure reduce and/or eliminate the dependence on subject matter experts by observing normal and abnormal changes, finding patterns among the changes, cleaning the observed patterns to eliminate pattern data that is less relevant to the drift issue of the computer system that is under investigation, and using the "clean" data to train an artificial neural network (ANN) to perform a drift detection function for the drift issue of the computer system that is under investigation function. In one or more embodiments, systems and methodologies of the present disclosure generate positive and negative drift cases from known drift sets and monitored servers; inject the known drift cases and normal changes into the computer system that is under investigation; applies domain independent cleaning rules to reduce the data scale to be analyzed; extract and normalize (i.e., convert text to numbers that fall within a range (e.g., from zero (0) to one (1)) features based on change object, change characteristics (e.g. change time, change behavior, etc.), change sequences; and train abnormal change classifiers with labeled training data using classification algorithms (e.g., an ANN or a support vector machine (SVM) or any other classification machine learning algorithm).

Figure 3:
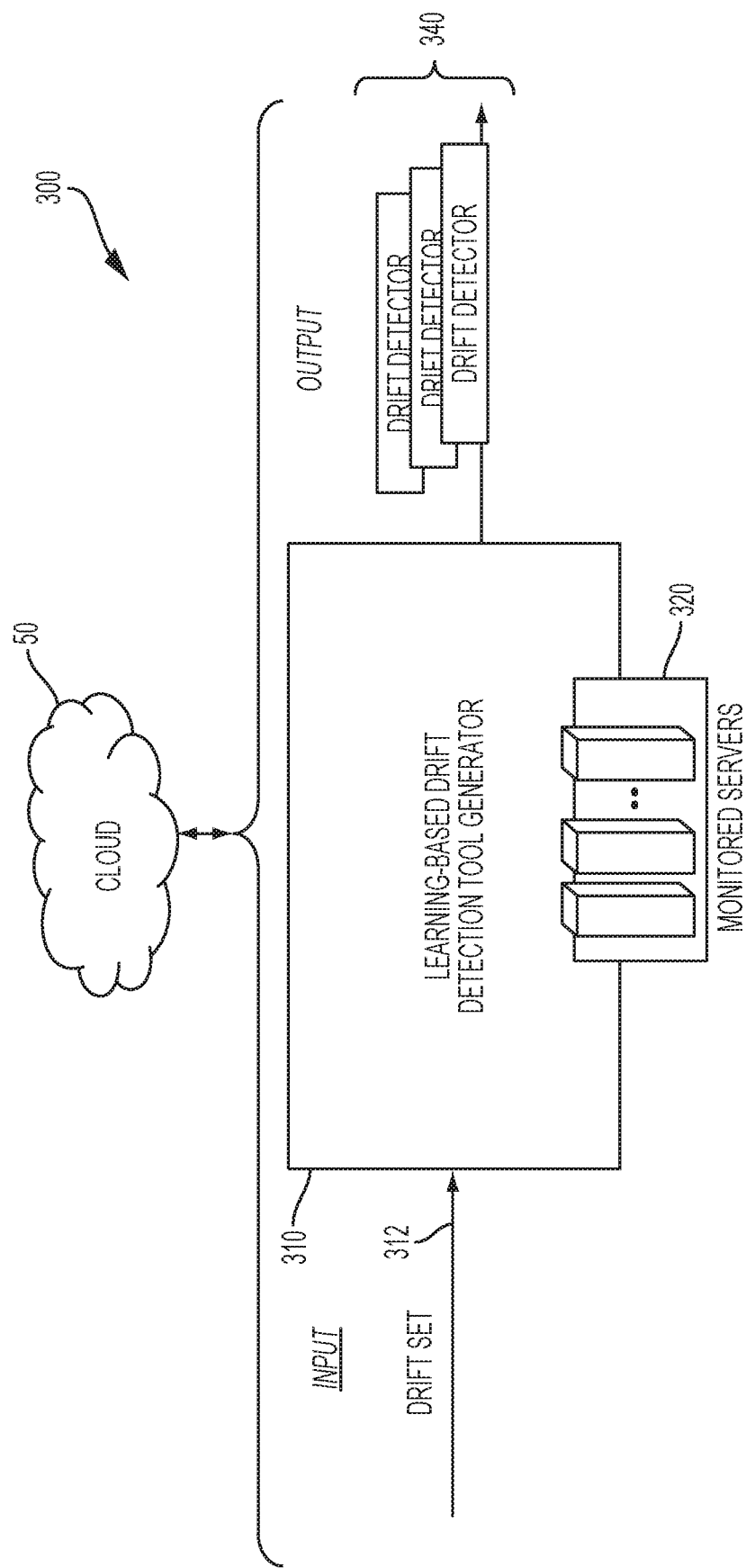
FIG. 3 depicts a system for generating a drift detection tool according to one or more embodiments.

Turning now to a more detailed description of the present disclosure, FIG. 3 depicts a learning-based drift detection tool generator system 300 according to one or more embodiments. System 300 includes a learning-based drift detection tool generator 310 that receives known/historical drift set inputs 312 and, utilizing monitored servers 320, generates drift detectors 340. Cloud 50 may supplement, support or replace some or all of the functionality of drift set inputs 312, drift detection tool generator 310, monitored servers 320 and drift detectors 340. Additionally, some or all of the functionality of drift detection tool generator 310, monitored servers 320 and drift detectors 340 may be implemented as a node 10 (shown in FIG. 1) of cloud 50.

In operation, drift detection tool generator 310 receives as inputs known/historical drift sets 312 (i.e., changes that are known to be abnormal) and generates positive and negative drift cases. Known drift sets 312 may be obtained from drift information that is published (e.g., posted on web sites) by users of computer systems that have experienced drift. Known drift sets 312 may be also be obtained by monitoring monitored servers 320. In one or more embodiments, known drift sets 312 may be assembled over time and accessed by drift detection tool generator 310 through cloud 50. The drift cases are then injected into the relevant computer system, and drift detection tool generator 310 observes the changes in the computer system that occurred prior to the injected drift cases, along with the changes to the computer system that occurred after the injected drift cases. A delta is then obtained between the changes in the computer system that occurred prior to the injected drift cases, and the changes to the computer system that occurred after the injected drift cases. This delta represents the set of changes in the computer system that is caused by the injected drift. The data that makes up this set of change (i.e., "change set data") is "cleaned" using cleaning rules, which may be domain independent, to remove the data that is not relevant to the particular drift issue that is under investigation, thereby reducing the size of the change set data. Feature extraction techniques are applied to the clean data set based on features such as change object, change characteristics (e.g., change time, change behavior, etc.), change sequences and the like. The feature extracted (i.e., labeled) data is then applied to change classifiers, which are trained using classification algorithms (e.g., SVM) to generate drift detectors 340. One or more of drift detectors 340 may be applied to the particular drift issue that is under investigation to identify one or more root causes of the drift issue.

Figure 4:
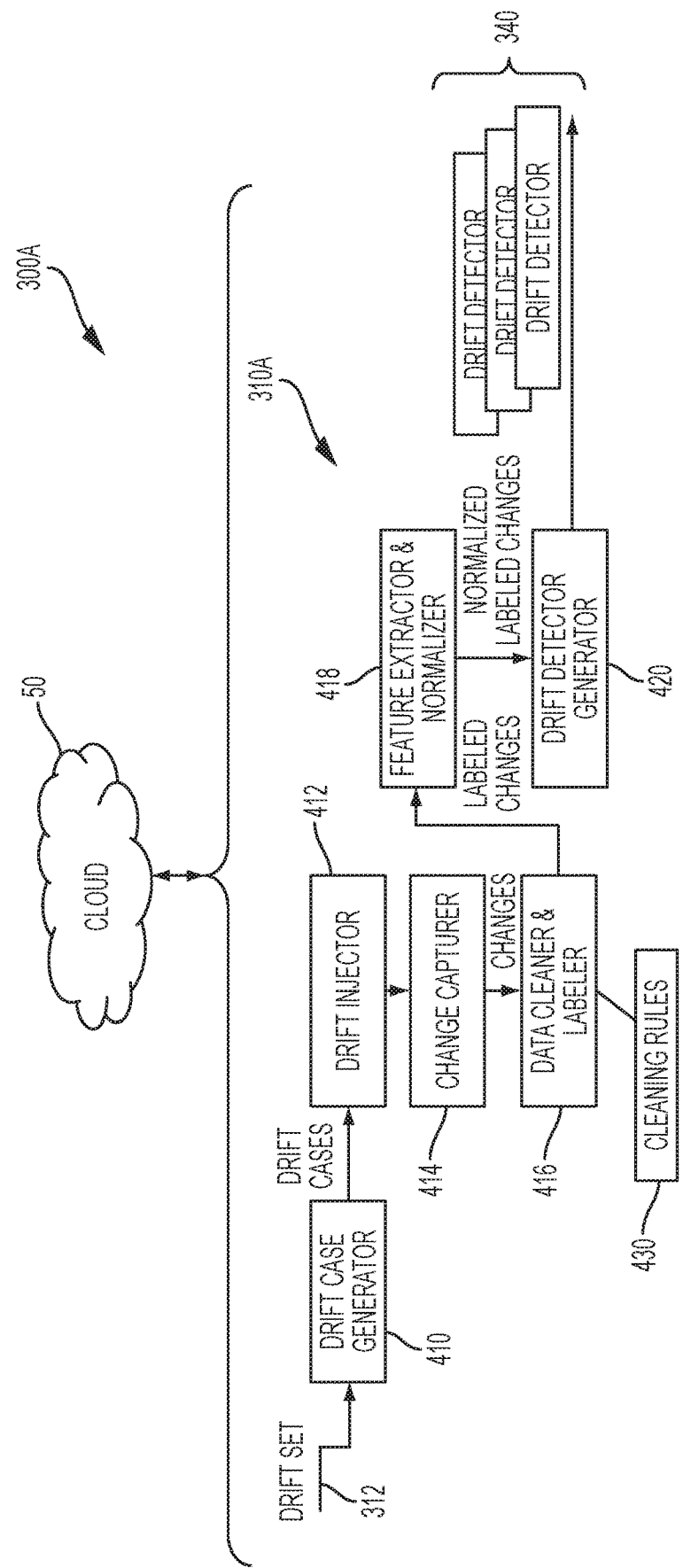
FIG. 4 depicts another system for generating a drift detection tool according to one or more embodiments.

FIG. 4 depicts a learning-based drift detection tool generator system 300A according to one or more embodiments. System 300A is an example implementation of system 300 shown in FIG. 3. System 300A includes a learning-based drift detection tool generator 310A that receives drift set inputs 312 and, utilizing monitored servers 320, generates drift detectors 340. Drift detection tool generator 310A includes a drift case generator 410, a drift injector 412, a change capturer 414, a data cleaner & labeler 416 (operating according to cleaning rules 430), a feature extractor & normalizer 418 and a drift detector generator 420, configured and arranged as shown. Cloud 50 may supplement, support or replace some or all of the functionality of drift set inputs 312, drift detection tool generator 310A, drift case generator 410, drift injector 412, change capturer 414, data cleaner & labeler 416 (operating according to cleaning rules 430), feature extractor & normalizer 418, drift detector generator 420 monitored servers 320 and drift detectors 340. Additionally, some or all of the functionality of drift detection tool generator 310A, drift case generator 410, drift injector 412, change capturer 414, data cleaner & labeler 416 (operating according to cleaning rules 430), feature extractor & normalizer 418, drift detector generator 420 monitored servers 320 and drift detectors 340 may be implemented as a node 10 (shown in FIG. 1) of cloud 50.

Figure 5:
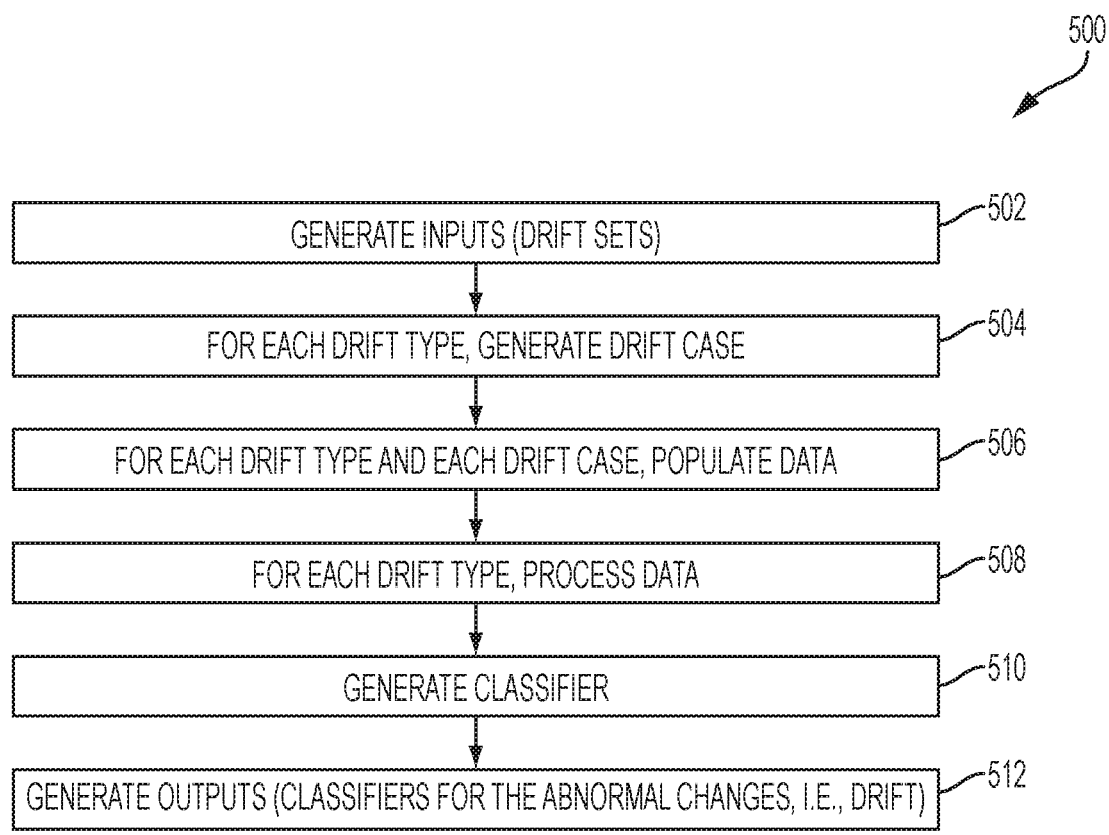
FIG. 5 depicts a methodology according to one or more embodiments.
Figure 6:
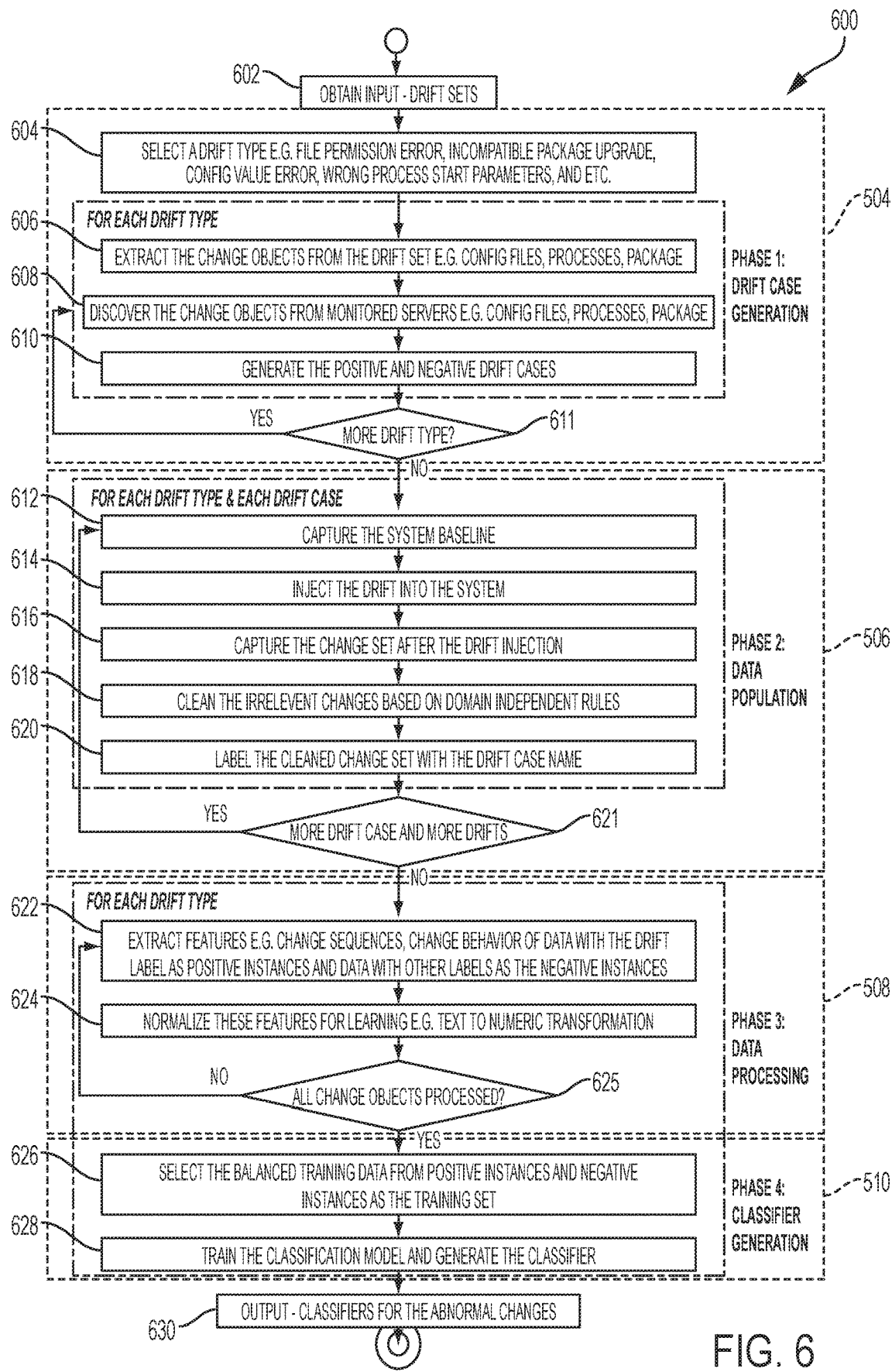
FIG. 6 depicts another methodology according to one or more embodiments.

Turning now to a more detailed description of the operation of one or more embodiments of the present disclosure, FIGS. 5 and 6 depict methodologies 500, 600 performed by systems 300, 300A shown in FIGS. 3 and 4. In comparison, system 300A shown in FIG. 4 is an exemplary implementation of system 300 shown in FIG. 3, and methodology 600 shown in FIG. 6 is an exemplary implementation of method 500 shown in FIG. 5. The following description of methodology 600 makes reference to components of systems 300, 300A shown in FIGS. 3 and 4, as well as operations of methodology 500 that are shown in FIG. 5 and in FIG. 6.

Methodology 600 begins at block 602 by obtaining known drift sets 312 as inputs. Methodology 600 is then divided into four phases, namely phase 1—drift case generation 504A, which corresponds to block 504 of methodology 500, phase 2—data population 506A, which corresponds to block 506 of methodology 500, phase 3—data processing 508A, which corresponds to block 508 of methodology 500, and phase 4—classifier generation 510A, which corresponds to block 510 of methodology 500. Additionally, in phase 1—drift case generation 504A corresponds to drift case generator 410, phase 2—data population 506A corresponds drift injector 412, change capturer 414 and data cleaner & labeler 416, phase 3—data processing 508A corresponds to feature extractor & normalizer 418, and phase 4—classifier generation 510A corresponds to drift detector generator 420. In general, phase 1 generates the drift case data, phase 2 processes the data to prepare it for learning, phase 3 extracts features of the processed data and phase 4 is the learning phase to generate the classifier for identifying the abnormal changes (i.e., "drift").

Returning now to phase 1, block 604 identifies the drift type of drift sets 312, wherein the drift type can include types such as a file permission error, an incompatible package upgrade, a configuration value error, wrong process start parameters, and the like. Block 606 extracts change objects (i.e., exactly what has been changed) from drift sets 312, and block 608 discovers the identified change objects from monitored servers 320. Block 610 generates the positive drift cases and the negative drift cases. The positive drift cases are the drift errors that are executed and that may cause the system problems. The negate drift cases are the drift errors that are based on files that are read from or written to but are not executed and that may cause the system problems. Decision block 611 determines whether there are more drift types. If the answer to the inquiry at decision block 611 is yes, methodology 600 proceeds to block 606 for the next drift type. If the answer to the inquiry at decision block 611 is no, methodology 600 proceeds to phase 2 at block 612.

Block 612 captures the baseline (i.e., minimum or starting point used for comparison) of the computer system that is under investigation. Block 614 injects the positive and the negative drift cases into the computer system that is under investigation, and block 616 captures the change set after the drift injection. Block 616 observes the changes in the computer system that occurred prior to the injected drift cases, along with the changes to the computer system that occurred after the injected drift cases. A delta is then obtained between the changes in the computer system that occurred prior to the injected drift cases, and the changes to the computer system that occurred after the injected drift cases. This delta represents the set of changes (i.e., "change set") in the computer system that are caused by the injected drift. In block 618, the data that makes up this "change set" data is "cleaned" using domain independent cleaning rules to remove the data that is not relevant to the particular drift issue that is under investigation, thereby reducing the size of the change set data. In block 620, the cleaned change set is labeled with the drift case name. Decision block 621 determines whether there are more drift cases and more drift types. If the answer to the inquiry at decision block 621 is yes, methodology 600 proceeds to block 612 to capture the baseline for the next drift case and the next drift type. If the answer to the inquiry at decision block 621 is no, methodology 600 proceeds to phase 3 at block 622.

Block 622 extracts features from the clean data set based on features such as change sequences, change behavior of data with the drift label as positive instances, data with other labels as the negative instances, etc. Block 624 then normalizes (i.e., converts text to numeric representations that fall within a range (e.g., from zero (0) to one (1)) the extracted features so they may be processed by a training algorithm. Decision block 625 determines whether all change objects have been processes. If the answer to the inquiry at decision block 625 is no, methodology 600 proceeds to block 622 to extract features for each drift type. If the answer to the inquiry at decision block 625 is yes, methodology 600 proceeds to phase 4 at block 626.

Block 626 selects a balanced set of training data taken from positive instances and negative instances. Block 628 uses the training set to train a classification model to generate the classifier. Block 630 outputs classifiers (i.e., drift detectors 340) that can be used to distinguish whether a change to the computer system that is under investigation is a normal change (i.e., not "drift") or an abnormal change (i.e., "drift").

Figure 9:
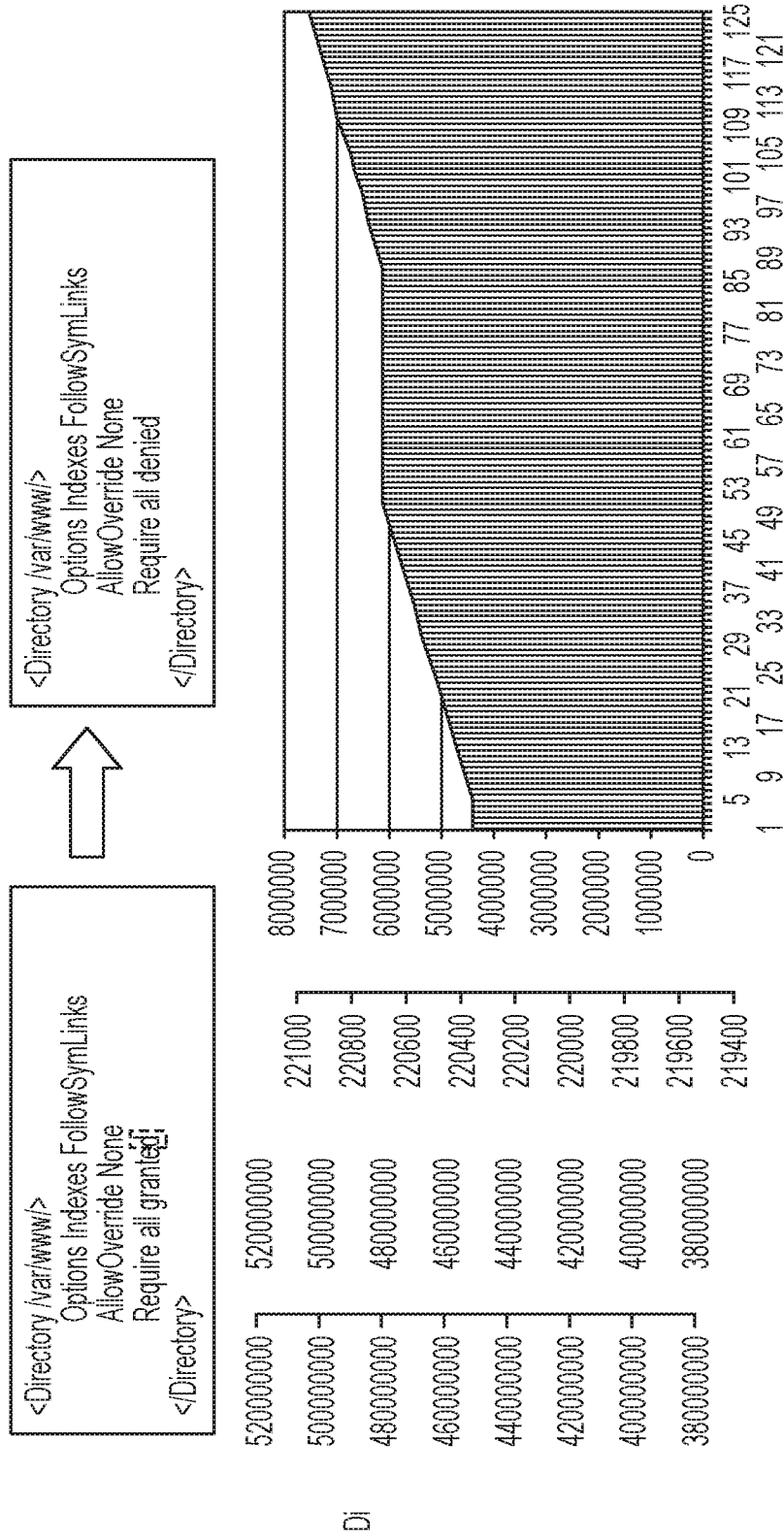
FIG. 9 depicts drift case generation examples according to one or more embodiments.
Figure 13:
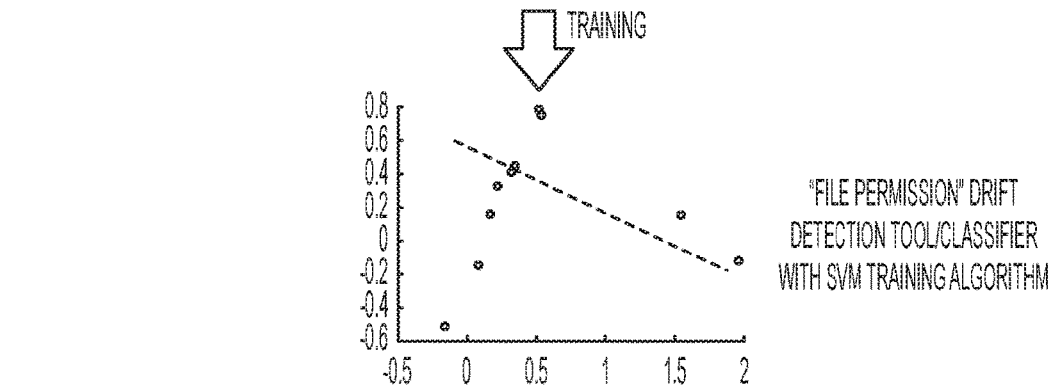
FIG. 13 depicts a drift detector generation example according to one or more embodiments.

FIGS. 7-13 depict examples of various operations of methodologies 500 and 600. FIG. 7 depicts domain independent cleaning rule examples according to one or more embodiments, wherein data is cleaned such that domain differences are not counted as differences. FIG. 8 depicts a feature definition example according to one or more embodiments, wherein examples are shown for change objects, change behavior and change characteristics. These items are used to specify exactly what changed, along with the key behaviors and characteristics of these changes. FIGS. 9 and 10 depict examples of publicly available drift cases that can be utilized in connection with one or more embodiments. FIG. 11 depicts feature extraction examples (e.g., time-stamp, object-type, object-name, etc.) according to one or more embodiments. FIG. 12 depicts feature normalization examples according to one or more embodiments, wherein the extracted features are converted from text to numerical values and normalized to fit with a range, e.g., from zero (0) to one (1). For the label, a numeric zero (0) is used to identify a normal change, and a numeric one (1) is utilized to identify an abnormal change. FIG. 13 depicts a drift detector generation example according to one or more embodiments, wherein a classifier trained in accordance with the present disclosure is used to classify proposed changes to a computer system under investigation as either abnormal (label=1) or normal (label=0).

The change classifier of the present disclosure (e.g., drift detector generator 420) can be implemented as a machine learning module having a trainable machine learning algorithm (e.g., SVM, ANN, etc.). In one or more embodiments, the disclosed change classifier includes an ANN having the capability to be trained to perform a particular function. Machine learning broadly describes a primary function of electronic systems that learn from data. In machine learning and cognitive science, ANNs are a family of statistical learning models inspired by the biological neural networks of animals, and in particular the brain. ANNs may be used to estimate or approximate systems and functions that depend on a large number of inputs and are generally unknown.

ANNs are often embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons which may be activated by the pixels of an input image. After being weighted and transformed by a function determined by the network's designer, the activations of these input neurons are then passed to other downstream neurons, which are often referred to as "hidden" neurons. This process is repeated until an output neuron is activated. The activated output neuron determines which character was read.

In one or more embodiments, the disclosed change classifier is a SVM having a capability to be trained to perform a particular function. In machine learning, SVMs are supervised learning models with associated learning algorithms that analyze data used for classification and regression analysis. Given a set of training examples, each marked for belonging to one of two categories, a SVM training algorithm builds a model that assigns new examples into one category or the other, making it a non-probabilistic binary linear classifier. A SVM model is a representation of the examples as points in space, so that mapped so that the examples of the separate categories are divided by a clear gap that is as wide as possible. New examples are then mapped into that same space and predicted to belong to a category based on which side of the gap they fall on.

Thus, it can be seen from the forgoing detailed description that one or more embodiments of the present disclosure provide technical effects and benefits. The present disclosure provides learning-based systems and methodologies for efficiently and effectively detecting abnormal change (i.e., "drift") in large, complex computing systems and applications that can result in reduced system/application performance and/or system/application failure. The learning-based systems and methodologies for detecting the root cause of drift according to the present disclosure reduce and/or eliminate the dependence on subject matter experts by observing normal and abnormal changes, finding patterns among the changes, cleaning the observed patterns to eliminate pattern data that is less relevant to the drift issue of the computer system that is under investigation, and using the "clean" data to train an ANN to perform a drift detection function for the drift issue of the computer system that is under investigation function. In one or more embodiments, systems and methodologies of the present disclosure generate positive and negative drift cases from known drift sets and monitored servers; inject the known drift cases and normal changes into the computer system that is under investigation; applies domain independent cleaning rules to reduce the data scale to be analyzed; extract and normalize (i.e., convert text to numbers that fall within a range (e.g., from zero (0) to one (1)) features based on change object, change characteristics (e.g. change time, change behavior, etc.), change sequences; and train abnormal change classifiers with labeled training data using classification algorithms (e.g., a SVM or any other classification machine learning algorithm).

Figure 14:
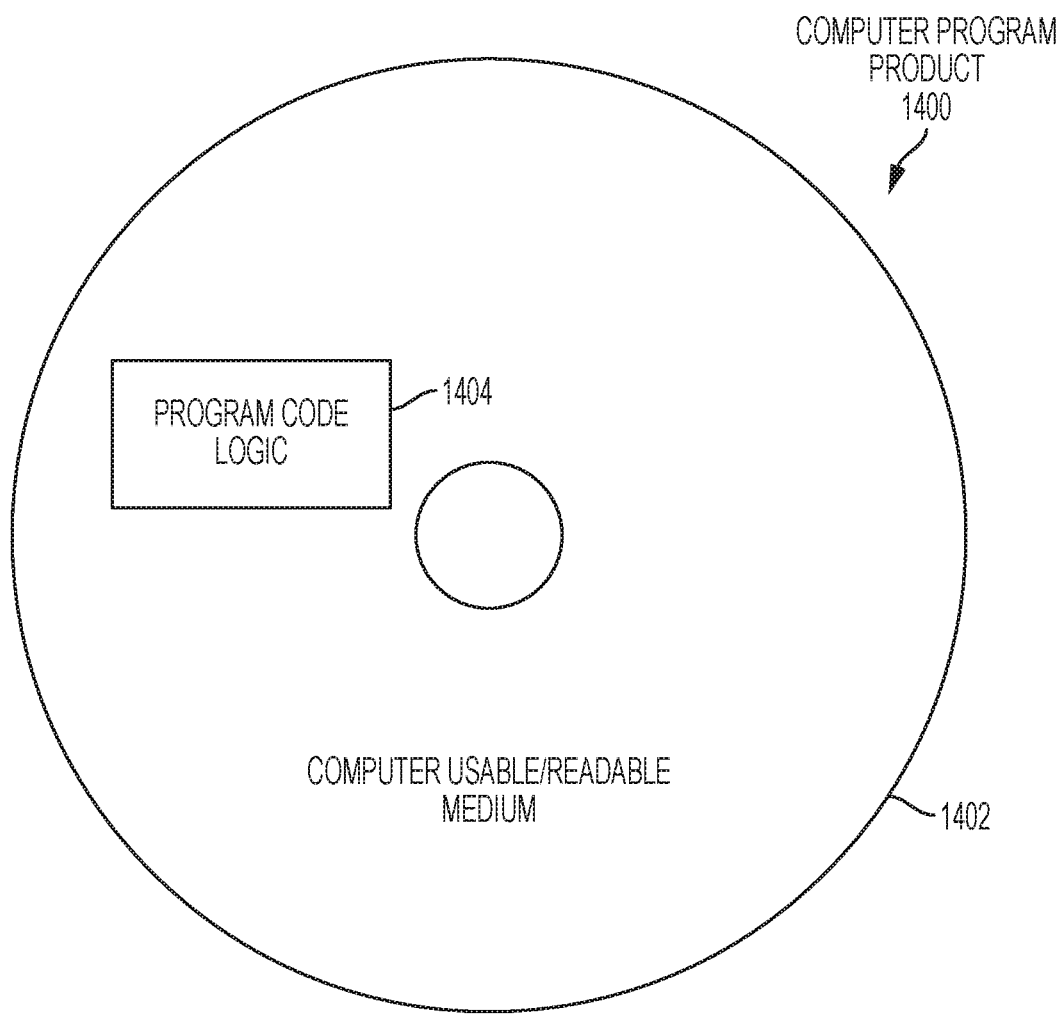
FIG. 14 depicts a diagram of a computer program product according to one or more embodiments.

Referring now to FIG. 14, a computer program product 1400 in accordance with an embodiment that includes a computer readable storage medium 1402 and program instructions 1404 is generally shown.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A computer implemented method comprising:
generating a drift detector configured to detect drift in a computer-under-investigation, wherein the drift comprises changes in the computer-under-investigation from exhibiting expected functional behavior to exhibiting unexpected functional behavior;
wherein generating the drift detector comprises:
using a processor of a learning-based drift detection tool generator to generate a set of a first type of known drift cases, wherein each of the first type of known drift cases comprises a known drift symptom and a known drift cause associated with the known drift symptom;
injecting, using the processor, the set of the first type of known drift cases into the computer-under-investigation to generate and capture captured changes in the computer-under-investigation over time to thereby generate a change data set configured to represent, for each drift case in the set of the first type of known drift cases, a set of deltas between captured changes that occurred in the computer-under-investigation prior to injecting each drift case of the first type of known drift cases and captured changes that occurred in the computer-under-investigation subsequent to injecting each drift case of the first type of known drift cases, wherein the set of deltas represents the captured changes in the computer-under-investigation that are caused by the set of the first type of known drift cases;
applying, using the processor, cleaning rules to the change data set, wherein the cleaning rules are configured to identify and remove from the change data set data that is determined, using the cleaning rules, to not be relevant to a set of drift issues associated with the first type of known drift cases, thereby reducing a size of the change data set and generating a cleaned change data set;
extracting one or more features of the cleaned change data set;
normalizing the one or more features of the cleaned change data set; and
using the extracted and normalized one or more features of the cleaned change data, along with at least one classification algorithm, to train and generate the drift detector comprising a computer-under-investigation model configured to classify changes in the computer-under-investigation;
wherein the drift detector is configured to:
use the computer-under-investigation model to perform a classification analysis of changes in functional behavior of the computer-under-investigation; and
based on a result of the classification analysis, generate a first classification output comprising a classification of at least one of the changes in functional behavior of the computer-under-investigation as drift.

2. The computer implemented method of claim 1, wherein the first type of known drift cases comprise:
positive drift cases that include drift errors that result from a known computer having executed an instruction; and
negative drift cases that include drift errors that are based on files that are read from or written to but are not executed.

3. The computer implemented method of claim 1 further comprising injecting, using the processor system, one or more normal changes into the computer-under-investigation.

4. The computer implemented method of claim 1, wherein the cleaning rules are domain independent.

5. The computer implemented method of claim 1, wherein the one or more features are selected from a group consisting of:
a change object;
a change characteristic; and
a change sequence.

6. The computer implemented method of claim 1, wherein the at least one classification algorithm is implemented using an artificial neural network (ANN).

7. The computer implemented method of claim 1, wherein the at least one classification algorithm is implemented using a support vector machine (SVM).

8. A computer system for generating a drift detector configured to detect drift in a computer-under-investigation, wherein the drift comprises changes in the computer-under-investigation from exhibiting expected functional behavior to exhibiting unexpected functional behavior, the computer system comprising:
    a memory; and
    a processor system of a learning-based drift detection tool communicatively coupled to the memory;
    wherein the processor system is configured to perform a method comprising generating a drift detector configured to detect drift in a computer-under-investigation, wherein the drift comprises changes in the computer-under-investigation from exhibiting expected functional behavior to exhibiting unexpected functional behavior;
    wherein generating the drift detector comprises:
        generating a set of a first type of known drift cases, wherein each of the first type of known drift cases comprises a known drift symptom and a known drift cause associated with the known drift symptom;
        injecting the set of the first type of known drift cases into the computer-under-investigation to generate and capture captured changes in the computer-under-investigation over time to thereby generate a change data set configured to represent, for each drift case in the set of the first type of drift cases, a set of deltas between captured changes that occurred in the computer-under-investigation prior to injecting each drift case of the first type of known drift cases and captured changes that occurred in the computer-under-investigation subsequent to injecting each drift case of the first type of known drift cases, wherein the set of deltas represents the captured changes in the computer-under-investigation that are caused by the set of the first type of known drift cases;
        applying cleaning rules to the change data set, wherein the cleaning rules are configured to identify and remove from the change data set data that is determined, using the cleaning rules, to not be relevant to a set of drift issues associated with the first type of known drift cases, thereby reducing a size of the change data set and generating a cleaned change data set;
        extracting one or more features of the cleaned change data set;
        normalizing the one or more features of the cleaned change data set; and
        using the extracted and normalized one or more features of the cleaned change data, along with at least one classification algorithm, to train and generate the drift detector comprising a computer-under-investigation model configured to classify changes in the computer-under-investigation;
    wherein the drift detector is configured to:
        use the computer-under-investigation model to perform a classification analysis of changes in functional behavior of the computer-under-investigation; and
        based on a result of the classification analysis, generate a first classification output comprising a classification of at least one of the changes in functional behavior of the computer-under-investigation as drift.

9. The computer system of claim 8, wherein the first type of known drift cases comprise:
    positive drift cases that include drift errors that result from a known computer having executed an instruction; and
    negative drift cases that include drift errors that are based on files that are read from or written to but are not executed.

10. The computer system of claim 8, wherein the method performed by the processor system further comprises injecting one or more normal changes into the computer-under-investigation.

11. The computer system of claim 8, wherein the cleaning rules are domain independent.

12. The computer system of claim 8, wherein the one or more features are selected from a group consisting of:
    a change object;
    a change characteristic; and
    a change sequence.

13. The computer system of claim 8, wherein the at least one classification algorithm is implemented using an artificial neural network (ANN).

14. The computer system of claim 8, wherein the at least one classification algorithm is implemented using a support vector machine (SVM).

15. A computer program product for generating a drift detector configured to detect drift in a computer-under-investigation, wherein the drift comprises changes in the computer-under-investigation from exhibiting expected functional behavior to exhibiting unexpected functional behavior, the computer program product comprising a computer readable storage medium having program instructions embodied therewith, wherein the computer readable storage medium is not a transitory signal per se, the program instructions readable by a processor system to cause the processor system to perform a method comprising:
    generating a drift detector configured to detect drift in a computer-under-investigation, wherein the drift comprises changes in the computer-under-investigation from exhibiting expected functional behavior to exhibiting unexpected functional behavior;
    wherein generating the drift detector comprises:
        generating a set of a first type of known drift cases, wherein each of the first type of known drift cases comprises a drift known symptom and a known drift cause associated with the known drift symptom;
        injecting the set of the first type of known drift cases into the computer-under-investigation to generate and capture captured changes in the computer-under-investigation over time to thereby generate a change data set configured to represent, for each drift case in the set of the first type of drift cases, a set of deltas between captured changes that occurred in the computer-under-investigation prior to injecting each drift case of the first type of known drift cases and captured changes that occurred in the computer-under-investigation subsequent to injecting each drift case of the first type of known drift cases, wherein the set of deltas represents the captured changes in the computer-under-investigation that are caused by the set of the first type of known drift cases;

applying cleaning rules to the change data set, wherein the cleaning rules are configured to identify and remove from the change data set data that is determined, using the cleaning rules, to not be relevant to a set of drift issues associated with the first type of known drift cases, thereby reducing a size of the change data set and generating a cleaned change data set;

extracting one or more features of the cleaned change data set;

normalizing the one or more features of the cleaned change data set; and using the extracted and normalized one or more features of the cleaned change data, along with at least one classification algorithm, to train and generate the drift detector comprising a computer-under-investigation model configured to classify changes in the computer-under-investigation;

wherein the drift detector is configured to:
    use the computer-under-investigation model to perform a classification analysis of changes in functional behavior of the computer-under-investigation; and
    based on a result of the classification analysis, generate a first classification output comprising a classification of at least one of the changes in functional behavior of the computer-under-investigation as drift.

16. The computer program product of claim 15, wherein the first type of known drift cases comprise:
    positive drift cases that include drift errors that result from a known computer having executed an instruction; and
    negative drift cases that include drift errors that are based on files that are read from or written to but are not executed.

17. The computer program product of claim 15, wherein the method performed by the processor system further comprises injecting one or more normal changes into the computer-under-investigation.

18. The computer program product of claim 15, wherein the cleaning rules are domain independent.

19. The computer program product of claim 15, wherein the one or more features are selected from a group consisting of:
    a change object;
    a change characteristic; and
    a change sequence.

20. The computer program product of claim 15, wherein the at least one classification algorithm is implemented using:
    an artificial neural network (ANN); or
    a support vector machine (SVM).

\* \* \* \* \*